US012639864B2

(12) United States Patent
Yoneda

(10) Patent No.: US 12,639,864 B2
(45) Date of Patent: May 26, 2026

(54) IMAGE PROCESSING APPARATUS, METHOD FOR IMAGE PROCESSING, AND STORAGE MEDIUM

(71) Applicant: CANON KABUSHIKI KAISHA, Tokyo (JP)

(72) Inventor: Keigo Yoneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 18/783,204

(22) Filed: Jul. 24, 2024

(65) Prior Publication Data

US 2025/0037322 A1      Jan. 30, 2025

(30) Foreign Application Priority Data

Jul. 25, 2023    (JP) ................................. 2023-120682
Feb. 22, 2024    (JP) ................................. 2024-025121

(51) Int. Cl.
G06T 11/00          (2026.01)
G11B 27/34          (2006.01)
H04N 5/268          (2006.01)

(52) U.S. Cl.
CPC .............. G06T 11/00 (2013.01); G11B 27/34 (2013.01); H04N 5/268 (2013.01); G06T 2200/24 (2013.01)

(58) Field of Classification Search
None
See application file for complete search history.

(56) References Cited

U.S. PATENT DOCUMENTS

2018/0295389 A1    10/2018  Kakurai
2019/0306486 A1*   10/2019  Nakajima ............ H04N 13/189
2021/0014425 A1     1/2021  Matsubayashi
2022/0368959 A1*   11/2022  Senokuchi ............ H04N 7/181
2023/0074282 A1     3/2023  Irie

FOREIGN PATENT DOCUMENTS

JP          2012109719 A       6/2012

* cited by examiner

*Primary Examiner* — Yingchun He
(74) *Attorney, Agent, or Firm* — Canon U.S.A., Inc. IP Division

(57)          ABSTRACT

An image processing apparatus for generating a virtual viewpoint video includes a first viewpoint determination unit arranged to generate a camera parameter of a first virtual camera based on an input value from a first input device, a playback-position determination unit arranged to determine a playback position of a virtual viewpoint image based on the input value from the first input device, a first-video generation unit arranged to generate a first virtual viewpoint video based on the first virtual camera and the playback position, a second viewpoint determination unit arranged to generate a camera parameter of a second virtual camera based on the input value from the first input device and an input value from a second input device, and a second video generation unit arranged to generate a second virtual viewpoint video based on the second virtual camera and the playback position.

13 Claims, 8 Drawing Sheets

FIG. 8

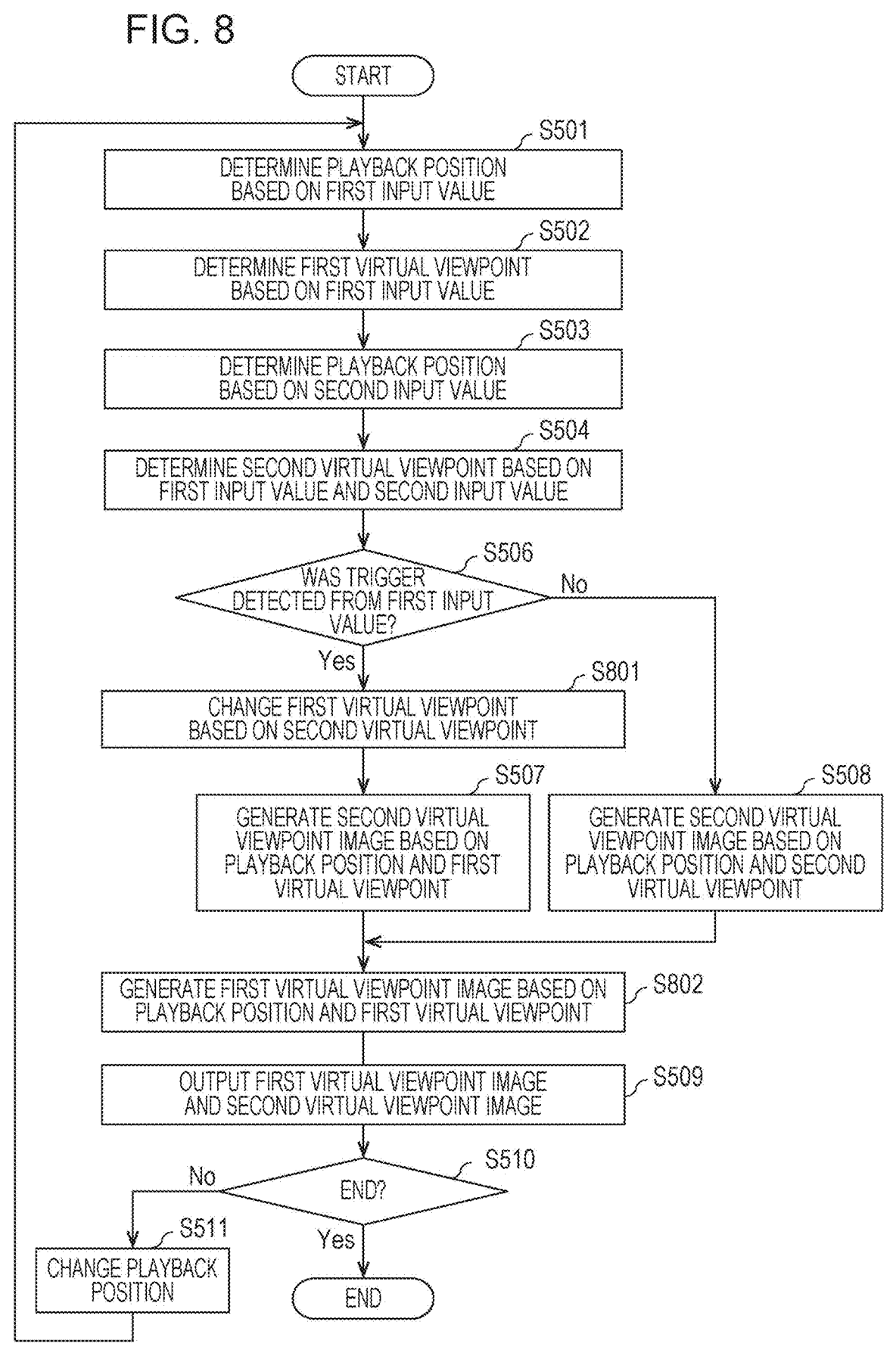

START

S501
DETERMINE PLAYBACK POSITION
BASED ON FIRST INPUT VALUE

S502
DETERMINE FIRST VIRTUAL VIEWPOINT
BASED ON FIRST INPUT VALUE

S503
DETERMINE PLAYBACK POSITION
BASED ON SECOND INPUT VALUE

S504
DETERMINE SECOND VIRTUAL VIEWPOINT BASED ON
FIRST INPUT VALUE AND SECOND INPUT VALUE

S506
WAS TRIGGER
DETECTED FROM FIRST INPUT
VALUE?
No

Yes

S801
CHANGE FIRST VIRTUAL VIEWPOINT
BASED ON SECOND VIRTUAL VIEWPOINT

S507
GENERATE SECOND VIRTUAL
VIEWPOINT IMAGE BASED ON
PLAYBACK POSITION AND FIRST
VIRTUAL VIEWPOINT

S508
GENERATE SECOND VIRTUAL
VIEWPOINT IMAGE BASED ON
PLAYBACK POSITION AND SECOND
VIRTUAL VIEWPOINT

S802
GENERATE FIRST VIRTUAL VIEWPOINT IMAGE BASED ON
PLAYBACK POSITION AND FIRST VIRTUAL VIEWPOINT

S509
OUTPUT FIRST VIRTUAL VIEWPOINT IMAGE
AND SECOND VIRTUAL VIEWPOINT IMAGE

S510
END?

No

Yes

S511
CHANGE PLAYBACK
POSITION

END

IMAGE PROCESSING APPARATUS, METHOD FOR IMAGE PROCESSING, AND STORAGE MEDIUM

BACKGROUND OF THE INVENTION

Field of the Invention

The present invention relates to an image processing apparatus for virtual viewpoint images, a method for controlling the same, and a program for the same.

Description of the Related Art

In recent years, a technique has emerged for generating virtual viewpoint images from any one or more viewpoints, in addition to the images at the camera positions, by using multiple viewpoint images captured through synchronized shooting with multiple cameras installed at different locations. Services that use virtual viewpoint images allow video producers to produce powerful viewpoint content from, for example, video footage of soccer or basketball games. The services also enable users who are viewing content to view the games while moving their viewpoints freely, allowing the users to view virtual viewpoint images from any locations.

Japanese Patent Laid-Open publication No. 2012-109719 discloses a method for controlling the positions of virtual cameras to achieve the composition desired by the operator of the virtual cameras.

However, the technique disclosed in Japanese Patent Laid-Open publication No. 2012-109719 does not take it account the coordination of a virtual viewpoint image among multiple users. For example, in a use case where a coach instructs players using a virtual viewpoint image generated from footage of a basketball game, it is conceivable that the coach and the players are viewing the virtual viewpoint image on separate devices. In this case, it is difficult for the coach to coordinate the virtual viewpoint image in such a way that allows the players to operate the virtual viewpoint image to some extent to grasp their surroundings, while also reflecting the desired shot for coaching the players to the virtual viewpoint image on the players' side.

SUMMARY OF THE INVENTION

An image processing apparatus according to an aspect of the present invention includes an acquisition unit arranged to obtain a plurality of images captured by a plurality of image capturing apparatuses, a first viewpoint determination unit arranged to generate a camera parameter of a first virtual camera based on an input value from a first input device, a playback-position determination unit arranged to determine a playback position of a virtual viewpoint image to be played back based on the input value from the first input device, a first-video generation unit arranged to generate a first virtual viewpoint video based on the plurality of images, the camera parameter of the first virtual camera, and the playback position, a second viewpoint determination unit arranged to generate a camera parameter of a second virtual camera based on the input value from the first input device and an input value from a second input device, and a second video generation unit arranged to generate a second virtual viewpoint video based on the plurality of images, the camera parameter of the second virtual camera, and the playback position.

BRIEF DESCRIPTION OF THE DRAWINGS

FIG. 8 is a flowchart illustrating an example of the processing procedure of an image processing apparatus according to the second embodiment.

DESCRIPTION OF THE EMBODIMENTS

Figure 1A:
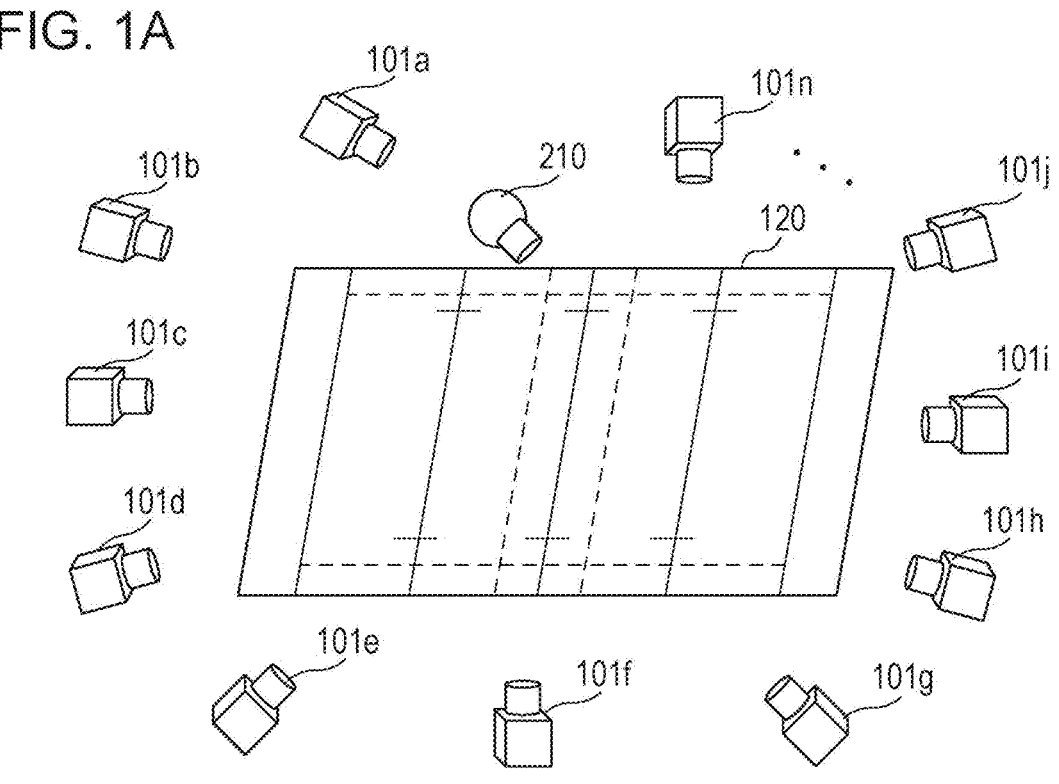
FIGS. 1A and 1B are diagrams illustrating an example of the configuration of a virtual-viewpoint-image generation system according to a first embodiment.

Embodiments of the present invention will be described in detail hereinbelow with reference to the accompanying drawing. It is to be understood that the following embodiments do not limit the claimed invention. Although the embodiments describe multiple features, not all of the multiple features are required for the invention, and any combinations of the multiple features are possible. Put another way, the embodiments described below can be implemented solely or as a combination of a plurality of elements or features thereof where necessary or where the combination of the elements or features from individual embodiments in a single embodiment is beneficial. In the accompanying drawings, identical or similar components are denoted by the same reference signs, and redundant descriptions may be omitted.

First Embodiment

This embodiment illustrates a system for generating a virtual viewpoint image representing the view from a specified virtual viewpoint based on multiple images captured by multiple image capturing apparatuses and the specified virtual viewpoint. The virtual viewpoint image in this embodiment is not limited to an image corresponding to the viewpoint that is freely specified by the user but includes an image corresponding to a viewpoint that is selected from multiple candidates (virtual viewpoint candidates) by the user. Although in this embodiment the description primarily focuses on cases where the specification of the virtual viewpoint is performed through user operation, the specification of the virtual viewpoint may be automatically performed based on the result of image analysis or the like.

In this embodiment, the description is performed using the term, virtual camera. The virtual camera is different from multiple image capturing apparatuses actually installed around the target image capturing area and is a concept for describing the virtual viewpoint for generating a virtual viewpoint image for convenience' sake. Specifically, the virtual viewpoint image may be regarded as an image captured from a virtual viewpoint set in a virtual space associated with the target image capturing area. The position and orientation of the virtual viewpoint in the image capturing may be represented as the position and orientation of the virtual camera. In other words, if a camera is present at the position of the virtual viewpoint set in a space, the virtual viewpoint image is a simulated image of the image captured by the camera.

Configuration of Virtual-Viewpoint-Image Generation System

First, the configuration of a virtual-viewpoint-image generation system according to this embodiment will be described with reference to FIGS. 1A and 1B.

The virtual-viewpoint-image generation system according to this embodiment includes n sensor systems 101a to 101n, each of which includes at least one camera (an image capturing apparatus). The n sensor systems are hereinafter referred to as multiple sensor systems 101 without distinguishing among the sensor systems unless otherwise specified.

Figure 1B:
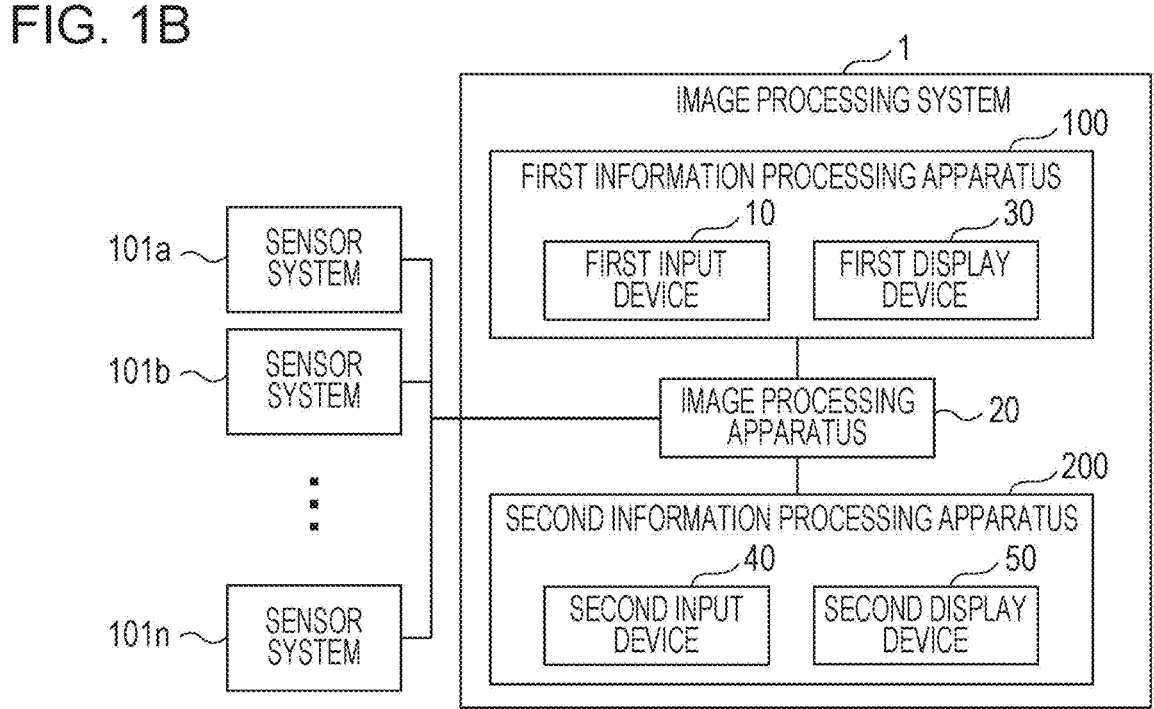

FIG. 1A is a diagram illustrating an example of installation of the multiple sensor systems 101. The multiple sensor systems 101 are installed around an area 120, which is a target image capturing area, to capture images of the area 120 from different directions. In the example of this embodiment, the target area 120 is a stadium field where soccer matches are played, and n (for example, 100) sensor systems 101 are installed around it. However, the number of sensor systems 101 installed is not limited, and the target area 120 is not limited to a stadium field. For example, the target area 120 may include stadium audience seats or may be an indoor studio or stage.

The multiple sensor systems 101 do not have to be installed around the entire perimeter of the area 120 and may be installed only in part of the perimeter of the area 120 due to location constraints or other limitations.

The multiple cameras of the multiple sensor systems 101 may include image capturing apparatuses with different functions, such as a telephotographic camera and a wide-angle camera.

The multiple cameras of the multiple sensor systems 101 capture images in synchronization. The multiple images captured by these cameras are referred to as multi-viewpoint images. The multi-viewpoint images in this embodiment may be captured images or images obtained by performing image processing such as a process for extracting a predetermined area from captured images.

The multiple sensor systems 101 may include microphones (not shown) in addition to the cameras. The microphones of the multiple sensor systems 101 collect sound in synchronization. Based on the collected sound, the multiple sensor systems 101 may generate acoustic signals to be played back together with the display of images on an image display apparatus. Description about sound will be omitted for ease of explanation. The images and sound are basically processed together.

An image processing system 1 includes an image processing apparatus 20, a first information processing apparatus 100, and a second information processing apparatus 200. The image processing system 1 acquires multi-viewpoint images from the multiple sensor systems 101 and stores the multi-viewpoint images in a database (not shown) along with the time codes used for image capturing. The time code is information used to uniquely identify the time at which the image capturing apparatus captured an image. The time code can be specified in a format such as "day:hour:minute: second:frame number". The image processing apparatus 20 generates a virtual viewpoint image from the stored multi-viewpoint images.

The first information processing apparatus 100 displays the virtual viewpoint image received from the image processing apparatus 20 on a first display device 30. The first information processing apparatus 100 receives a manual user operation on a virtual camera 210 with a first input device 10 and provides the operation to the image processing apparatus 20. The second information processing apparatus 200 displays the virtual viewpoint image received from the image processing apparatus 20 on a second display device 50. The second information processing apparatus 200 receives a manual user operation on the virtual camera with a second input device 40 and provides the operation to the image processing apparatus 20. Examples of the first information processing apparatus 100 and the second information processing apparatus 200 include tablet terminals, smartphones, head-mount displays (HMDs), and other portable terminals.

The virtual camera 210 can be set at a viewpoint different from the viewpoints of all the cameras of the multiple sensor systems 101 in a virtual space associated with the area 120. Here, different virtual cameras are set for the virtual viewpoint image to be provided to the first information processing apparatus 100 and the virtual viewpoint image to be provided to the second information processing apparatus 200. The virtual viewpoint image generated by the image processing apparatus 20 is an image representing the view from the virtual camera 210. The virtual viewpoint image in this embodiment is also referred to as free viewpoint video.

In this embodiment, the description primarily focuses on cases where the virtual viewpoint images are moving images, but the virtual viewpoint images may be still images.

Configuration of Image Processing Apparatus and Information Processing Apparatus Next, an example of the hardware configuration of the information processing apparatus and the image processing apparatus according to this embodiment will be described with reference to FIGS. 2A and 2B.

Figure 2A:
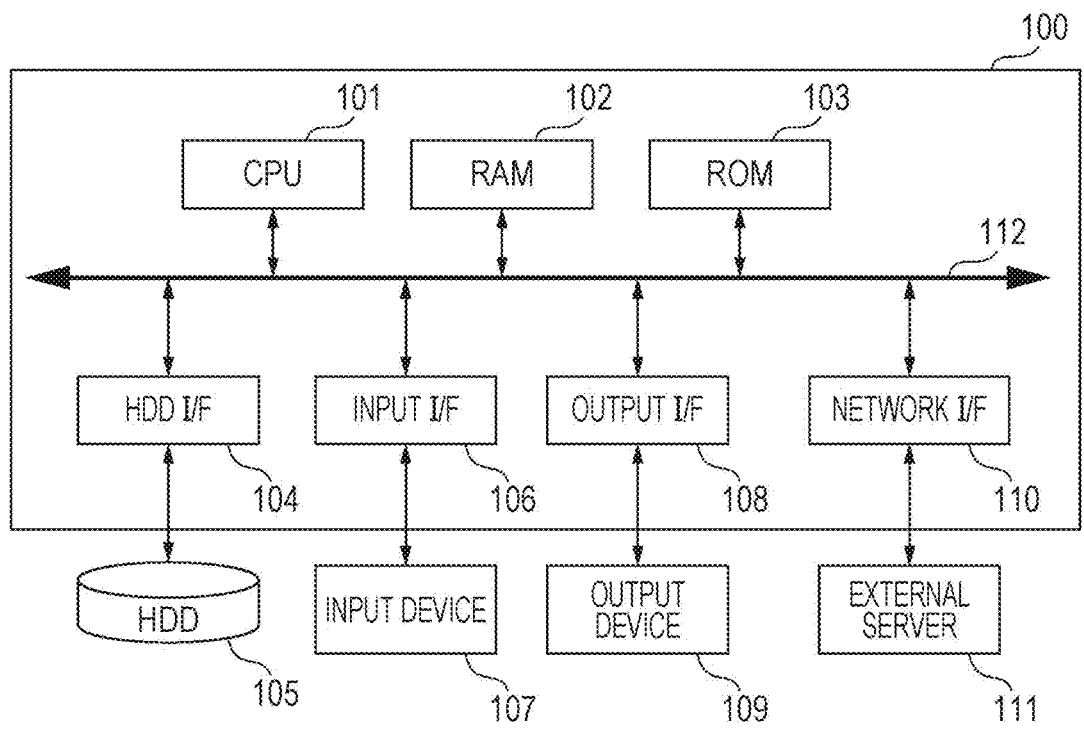
FIG. 2A is a block diagram illustrating an example of the hardware configuration of an information processing apparatus according to the first embodiment.

FIG. 2A illustrates an example of the hardware configuration of the information processing apparatus. While the configuration of the first information processing apparatus 100 is described, the second information processing apparatus 200 has the same configuration.

A central processing unit (CPU) 101 controls the configurations described below via a system bus 112 by executing the programs stored in a read-only memory (ROM) 103 and/or a hard disk drive (HDD) 105 using a random-access memory (RAM) 102 as a work memory. Thus, the following various processes are executed.

An example of an HDD interface (I/F) 104 is a serial ATA (SATA) that connects the information processing apparatus to the HDD 105, an optical disk drive, a solid-state drive (SSD), a flash memory, or another secondary storage. In this embodiment, the HDD 105 is used as an example of the secondary storage. The CPU 101 is capable of reading and writing data from/to the HDD 105 via the HDD interface (I/F) 104. The CPU 101 loads the data stored in the HDD 105 into the RAM 102. The CPU 101 is also configured to store various data on the RAM 102 obtained by executing programs in the HDD 105.

An input interface (I/F) 106 connects the information processing apparatus to one or multiple input devices 107 for inputting coordinates, such as a touch panel, a keyboard, a mouse, a digital camera, and a scanner. Examples of the input interface (I/F) 106 include serial bus interfaces such as a universal serial bus (USB) and IEEE1394. The CPU 101 is configured to read data from the input device 107 via the input I/F 106. In this embodiment, the input interface 106 and the first input device 10 are connected.

An output interface (I/F) 108 connects the information processing apparatus to an output device 109 such as a display. Examples of the output interface (I/F) 108 include video output interfaces such as a digital visual interface (DVI) and a high-definition multimedia interface (HDMI)®. The CPU 101 sends data related to virtual viewpoint video to the output device 109 via the output I/F 108 to display the virtual viewpoint video. A network interface (I/F) 110 is a network card, such as a local area network (LAN) card, that connects the information processing apparatus to an external server 111. The CPU 101 is configured to read data from the external server 111 via the network I/F 110. In this embodiment, the output interface 108 and the first display device 30 are connected.

Figure 2B:
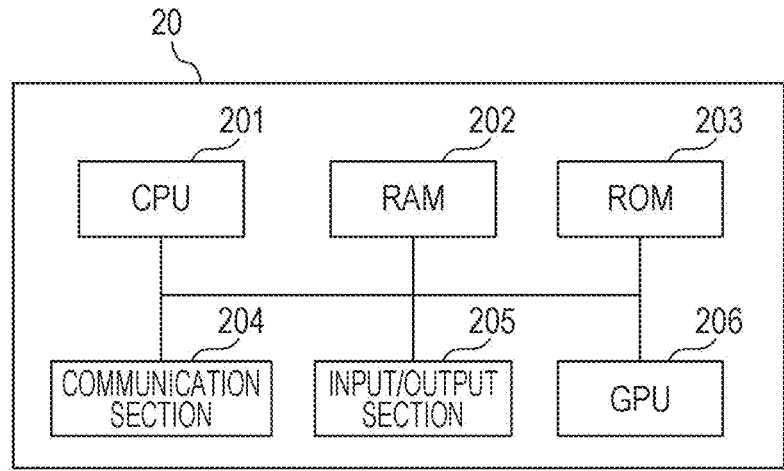
FIG. 2B is a block diagram illustrating an example of the hardware configuration of an image processing apparatus according to the first embodiment.
Figure 3:
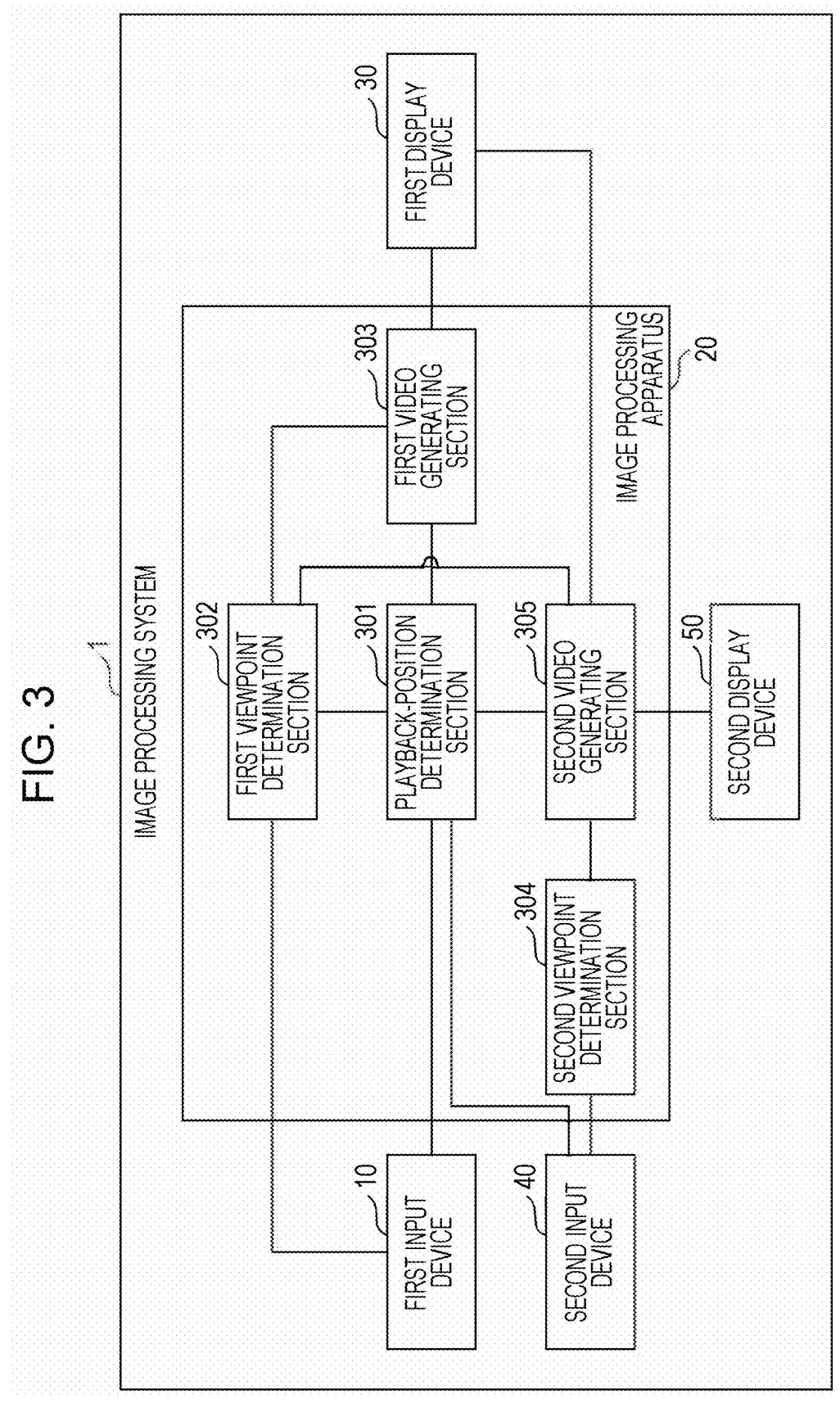
FIG. 3 is a diagram illustrating an example of the functional configuration of an image processing system according to the first embodiment.

FIG. 2B illustrates an example of the hardware configuration of the image processing apparatus 20. A CPU 201 controls the configurations described below by executing the programs stored in a ROM 203 using a RAM 202 as a work memory.

A communication section 204 connects to the information processing apparatus 20 to perform data communication. The communication section 204 performs the communication according to a communication standard, such as Ethernet or IEEE802.11 (commonly known as wireless LAN). The CPU 201 transmits and receives data to/from the information processing apparatus 20 or another external apparatus via the communication section 204.

An input/output section 205 inputs/outputs data via an input interface or an output interface. The input/output section 205 connects to a mouse, a keyboard, a display, a digital camera, or another device.

A graphical processing unit (GPU) 206 is an arithmetic unit or processor specialized for image processing. The GPU 206 performs image processing, such as generating a virtual viewpoint image from images input from the multiple sensor systems 101.

Image Processing System

Next, an example of the functional configuration of the image processing system 1 according to this embodiment will be described with reference to FIG. 3 and FIGS. 4A to 4D. This embodiment describes a use case in which a user who uses the first display device 30 can also operate a virtual viewpoint image displayed on the second display device 50. This use case assumes a case in which a coach of sports competition uses the first display device 30, and players who are instructed by the coach use the second display device 50. In such a case, the coach may allow the players to operate the virtual viewpoint image to some extent to grasp their surroundings, while also reflecting the desired shot for coaching the players to the virtual viewpoint image on the players' side. This embodiment describes a particularly suitable image processing system for such coaching. However, it will be understood that the invention is not necessarily limited to coaching and sporting applications. The term coach or player(s) are used in the embodiments below are examples and may be considered illustrative of the situation in which the invention may be useful. Reference to coach may be considered as referring to a person in charge of showing or controlling the viewing of a particular virtual viewpoint image to one or more viewers, the coach may be considered a first user. Reference to the player(s) may be considered as referring to a person or persons would receive the virtual viewpoint image from the person in charge of showing or controlling the viewing of the particular virtual viewpoint image, the player may be considered a second user.

A playback-position determination section 301 determines the playback position of the virtual viewpoint image according to an instruction input from the first input device 10 of the first information processing apparatus 100. An example of the playback position is a time code.

A first viewpoint determination section 302 determines the parameters of the virtual camera according to an instruction input from the first input device 10 of the first information processing apparatus 100. Examples of the parameters of the virtual camera include position and orientation. The position of the virtual camera is represented, for example, by three-dimensional coordinates (x, y, z). The orientation of the virtual camera is represented, for example, in three directions: pan, tilt, and roll.

A first video generating section 303 generates a virtual viewpoint image based on the playback position determined by the playback-position determination section 301 and the position and orientation of the virtual camera determined by the first viewpoint determination section 302. The virtual viewpoint image generated by the first video generating section 303 is displayed on the first display device 30 of the first information processing apparatus 100.

A second viewpoint determination section 304 determines the position and orientation of the virtual camera according to an instruction input from the second input device 40 of the second information processing apparatus 200. The position of the virtual camera is represented, for example, by the three-dimensional coordinates (x, y, z). The orientation of the virtual camera is represented, for example, in three directions: pan, tilt, and roll.

A second video generating section 305 generates a virtual viewpoint image based on the playback position determined by the playback-position determination section 301, the position and orientation of the virtual camera determined by the first viewpoint determination section 302, and the position and orientation of the virtual camera determined by the second viewpoint determination section 304. Unlike the first video generating section 303, the second video generating section 305 generates the virtual viewpoint image using the information on the positions and orientations of the virtual cameras determined by the multiple viewpoint determination sections 302 and 304. The virtual viewpoint image generated by the second video generating section 305 is displayed on the first display device 30 of the first information processing apparatus 100 and the second display device 50 of the second information processing apparatus 200.

Although in this embodiment the first video generating section 303 and the second video generating section 305 generate virtual viewpoint images using the playback position determined by the playback-position determination section 301, the playback-position determination section may be prepared for each of the generating sections 303 and 305. In other words, in an example of this embodiment, two playback-position determination sections may be prepared, and the first video generating section 303 and the second video generating section 305 may generate virtual viewpoint images individually using playback positions determined by the individual playback-position determination sections.

Next, the virtual viewpoint images and the graphical user interfaces (GUIs) displayed on the first display device 30 and the second display device 50 will be described with reference to FIGS. 4A to 4D. In this embodiment, the first display device 30 is used by a coach, and the second display device 50 is used by players. FIG. 4A to 4D illustrate basketball game footage, in which the rectangular-solid objects are simplified human figures, and the sphere is a basketball figure.

Figures 4A, 4B, 4C, 4D:
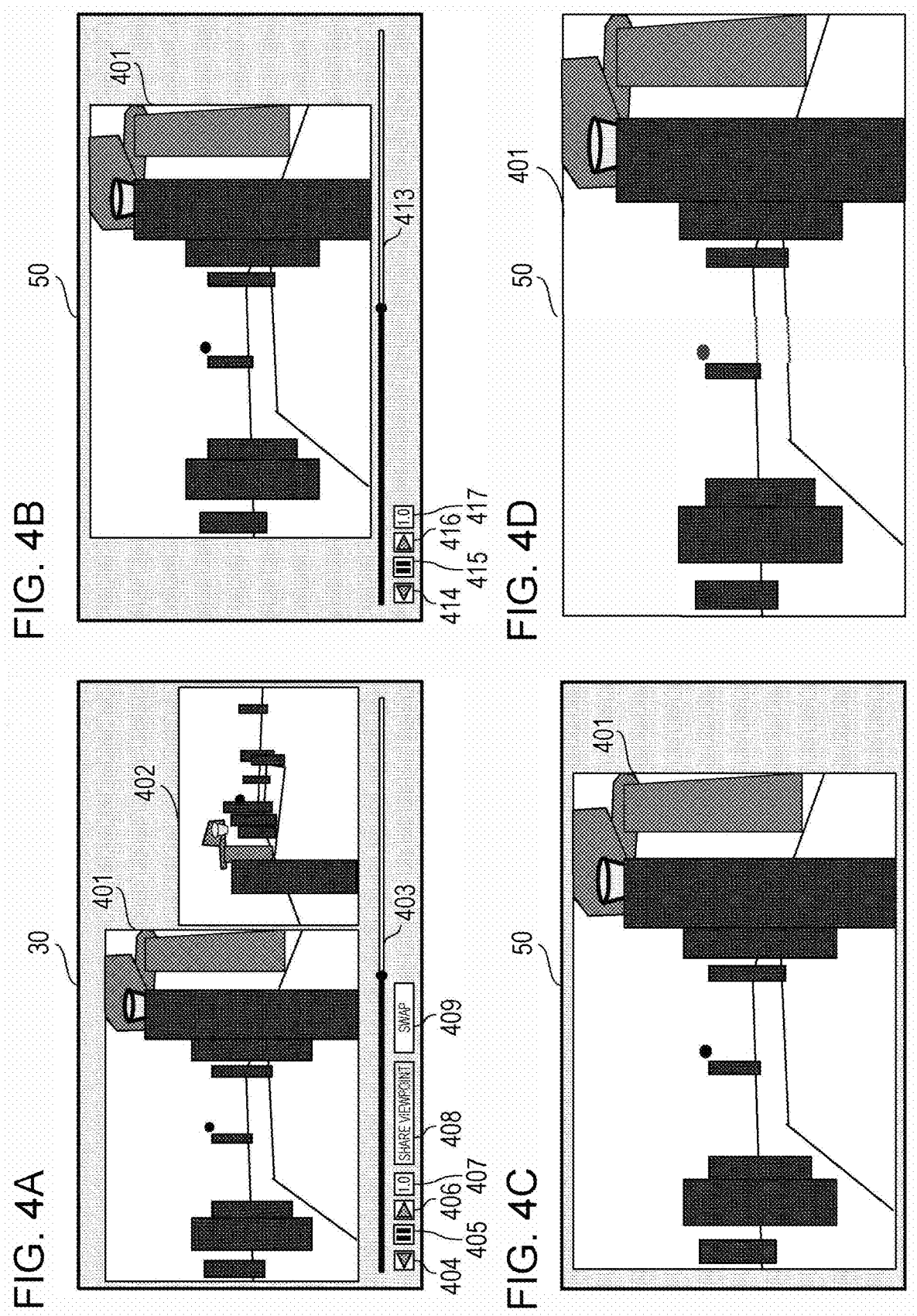
FIGS. 4A to 4D are diagrams illustrating examples of the display form of a virtual viewpoint image according to the first embodiment.

FIG. 4A illustrates an example of the GUI displayed on the first display device 30. FIGS. 4B to 4D illustrate examples of the GUI displayed on the second display device 50. The GUIs displayed on the second display device 50 may be switched according to the configuration and type of the second information processing apparatus 200 or the mode, such as a window mode or a full-screen mode, selected from the second information processing apparatus 200.

A virtual viewpoint image 401 is displayed on both of the first display device 30 and the second display device 50. A virtual viewpoint image 402, i.e. a further virtual viewpoint image, is displayed only on the first display device 30. In other words, the virtual viewpoint image 401 is viewed by both the players and the coach, while the virtual viewpoint image 402 is viewed by the coach only.

If the coach is performing no operation, the position of the virtual camera for the virtual viewpoint image 401 is fixed regardless of the operation by the player. This is because the position specified by the coach is considered to be the position of the viewpoint the coach wants to show the players for coaching purposes. However, the orientation of the virtual camera for the virtual viewpoint image 401 can be changed by the players' operation. For example, in the case where the second input device 40 is a touch panel, the players can change the orientation of the virtual camera for the virtual viewpoint image 401 with a swiping operation. In another example, in the case where the second input device 40 is a mouse, the players can change the orientation of the virtual camera for the virtual viewpoint image 401 with a dragging operation. Thus, the coach may allow the players to operate the virtual viewpoint image to some extent, while also reflecting the desired shot for coaching the players to the virtual viewpoint image on the players' side. The position of the virtual camera does not have to be fixed and may be adjustable within a predetermined range centered around the virtual camera position specified by the coach.

The virtual viewpoint image 402 is a virtual viewpoint image for the coach to prepare a virtual viewpoint image that the coach wants the player to see next. The coach may change the position and orientation of the virtual camera for the virtual viewpoint image 402 with the first input device 10. For example, in the case where the first input device 10 is a touch panel, the coach may change the orientation of the virtual camera for the virtual viewpoint image 402 with a swiping operation. In another example, in the case where the first input device 10 is a mouse, the coach can change the orientation of the virtual camera for the virtual viewpoint image 402 with a dragging operation.

When the coach selects a viewpoint share button 408 with the first input device 10, the position and orientation of the virtual camera for the virtual viewpoint image 402 is applied to the position and orientation of the virtual camera for the virtual viewpoint image 401. This allows the coach to switch the virtual viewpoint images for the players. When the coach selects a swap button 409 with the first input device 10, the position and orientation of the virtual camera for the virtual viewpoint image 402 and the position and orientation of the virtual camera for the virtual viewpoint image 401 are swapped. This configuration allows the coach to have the players view the virtual viewpoint image while switching between multiple virtual viewpoints, for example, providing coaching while including the perspective of opposing players.

In the case where the viewpoint share button 408 is selected, the parameters of the virtual camera for the virtual viewpoint image 402 do not have to be immediately applied to the virtual camera for the virtual viewpoint image 401. For example, after the coach selects the viewpoint share button 408 and before the parameters of the virtual camera for the virtual viewpoint image 402 is applied to the virtual camera for the virtual viewpoint image 401, a message that notifies of switching of viewpoints may be displayed on the virtual viewpoint image 401 for a few seconds. This configuration prevents the viewer from confusion due to rapid changes in the position and orientation of the virtual viewpoint for the virtual viewpoint image 401. This process is also applicable to the case where the swap button 409 is selected.

When the viewpoint share button 408 is selected, a button for selecting whether to apply the parameters of the virtual camera for the virtual viewpoint image 402 may be superimposed on the virtual viewpoint image 401. When application of the parameters of the virtual camera for the virtual viewpoint image 402 to the virtual viewpoint image 401 is accepted with the button displayed on the virtual viewpoint image 401, processing for sharing the viewpoint is executed. This allows for preventing switching between virtual viewpoints at a timing unintended by the player. This process is also applicable to the case where the swap button 409 is selected.

The first information processing apparatus 100 may store the positions and orientations of multiple virtual cameras specified by the coach and determine the virtual viewpoint from among the stored list. This allows the coach to change the viewpoint to a desired viewpoint without performing a virtual-camera viewpoint operation each time. For example, by storing the position and orientation of virtual cameras at attention-getting locations, such as below the goal of a basketball court, the coach can switch to a virtual viewpoint image at a desired viewpoint only by selecting one from the list as needed. Providing such an operating method simplifies the user's operations.

The image processing system 1 may store the parameters of a series of virtual cameras as the path of the virtual cameras (camera path). This is however illustrative only. The image processing system 1 may specify multiple camera parameters in key frames, automatically interpolate the camera parameters between the key frames to create a camera path, and store the camera path. The image processing system 1 reproduces the path of the virtual cameras based on the camera path to generate the virtual viewpoint image 401. This allows the coach to set a viewpoint for the players across multiple frames.

A seek bar 403 is a GUI representing the playback position (time code) of the virtual viewpoint image 402. The coach can select any playback position by selecting a position on the seek bar 403. A reverse playback button 404 is for reversely playing back the virtual viewpoint image 402. A pause/resume button 405 is for pausing or resuming the playback of the virtual viewpoint image 402. A forward playback button 406 is for forwardly playing back the virtual viewpoint image 402. A playback speed 407 is an item for changing the playback speed of the virtual viewpoint image 402. The coach can change the playback speed of the virtual viewpoint image 402 through direct input or by selecting from options presented in a pull-down menu. For example, if 1 is selected for the playback speed 407, the virtual viewpoint image 402 is played back at a normal speed. If a value less than 1 is selected for the playback speed 407, the virtual viewpoint image 402 is played back slowly. If a value greater than 1 is selected for the playback speed 407, the virtual viewpoint image 402 is played back at high speed.

FIG. 4B illustrates an example of the GUI displayed on the second display device 50. This GUI is displayed on the second information processing apparatus 200, which is, for example, a personal computer (PC) or a tablet terminal.

A seek bar 413 is a GUI representing the playback position (time code) of the virtual viewpoint image 401. The players can select any playback position by selecting a position on the seek bar 413. A reverse playback button 414 is for reversely playing back the virtual viewpoint image 401. A pause/resume button 415 is for pausing or resuming the playback of the virtual viewpoint image 401. A forward playback button 416 is for forwardly playing back the virtual viewpoint image 401. A playback speed 417 is an item for changing the playback speed of the virtual viewpoint image 401. The players can change the playback speed of the virtual viewpoint image 401 through direct input or by selecting from options presented in a pull-down menu. For example, if 1 is selected for the playback speed 417, the virtual viewpoint image 401 is played back at a normal speed. If a value less than 1 is selected for the playback speed 417, the virtual viewpoint image 401 is played back slowly. If a value greater than 1 is selected for the playback speed 417, the virtual viewpoint image 401 is played back at high speed.

In FIG. 4B, the time width of the playback position that can be changed using the seek bar 413 may be smaller than the time width of the playback position that can be changed using the seek bar 403. This allows the coach to prevent the shot (playback position) intended for coaching the players from being changed to a different shot (playback position) by the players.

FIG. 4C illustrates other examples of the GUI displayed on the second display device 50. This GUI is displayed on the second information processing apparatus 200, which is a smartphone, a tablet terminal, or another potable device. FIG. 4C does not display a GUI for controlling the virtual viewpoint image 401 unlike the GUIs illustrated in FIG. 4B. In such a case, the players can change the orientation of the virtual camera for the virtual viewpoint image 401 using the touch panel or the acceleration sensor of the second information processing apparatus 200 but cannot perform other operations. The coach can display a GUI suitable for the purpose of the coaching on the second information processing apparatus 200 by giving an instruction from the first information processing apparatus 100 to switch between the GUI in FIG. 4B and the GUI in FIG. 4C.

FIG. 4D illustrates another example of the GUI displayed on the second display device 50. This GUI is displayed on the second information processing apparatus 200, which is a wearable device, such as an HMD. Alternatively, the GUI in FIG. 4D is displayed on the second information processing apparatus 200 by shifting the GUI illustrated in FIG. 4B or FIG. 4C to a full-screen mode. In FIG. 4D, the virtual viewpoint image 401 is displayed in full screen, and an operating GUI, etc. are not displayed.

In the case where the GUI illustrated in FIG. 4C or FIG. 4D is displayed on the second display device 50, the playback position of the virtual viewpoint image 401 is changed using the seek bar 403 displayed on the first display device 30. In this case, the playback state of the virtual viewpoint image 401 is controlled using the reverse playback button 404, the pause/resume button 405, the forward playback button 406, and the playback speed 407.

In this embodiment, changing only the orientation of the virtual camera for the virtual viewpoint image 401 may not be operated from the first input device 10. This is because, for example, if the players are viewing the virtual viewpoint image 401 through an HMD, and only the orientation of the virtual camera is changed by the coach, the players may lose track of where the players are looking, leading to a situation where the players cannot concentrate on viewing the virtual viewpoint image.

Any of the GUIs (FIGS. 4B to 4D) displayed on the second information processing apparatus 200 may be selected from the first information processing apparatus 100. This allows the coach to control the content displayed on the second information processing apparatus 200 used by the players, depending on the details of coaching.

In this embodiment, the virtual viewpoint image 401 and the virtual viewpoint image 402 are played back in a loop. This allows the coach or the players to repeatedly view the same shot.

When the playback speed 407 is changed while the virtual viewpoint image 402 is paused, the virtual viewpoint image 402 may automatically resume the playback. This saves the user from pressing the playback button. Similarly, when the playback speed 417 is changed while the virtual viewpoint image 401 is paused, the virtual viewpoint image 401 may automatically resume the playback.

Processing by Image Processing Apparatus 20

Figure 5:
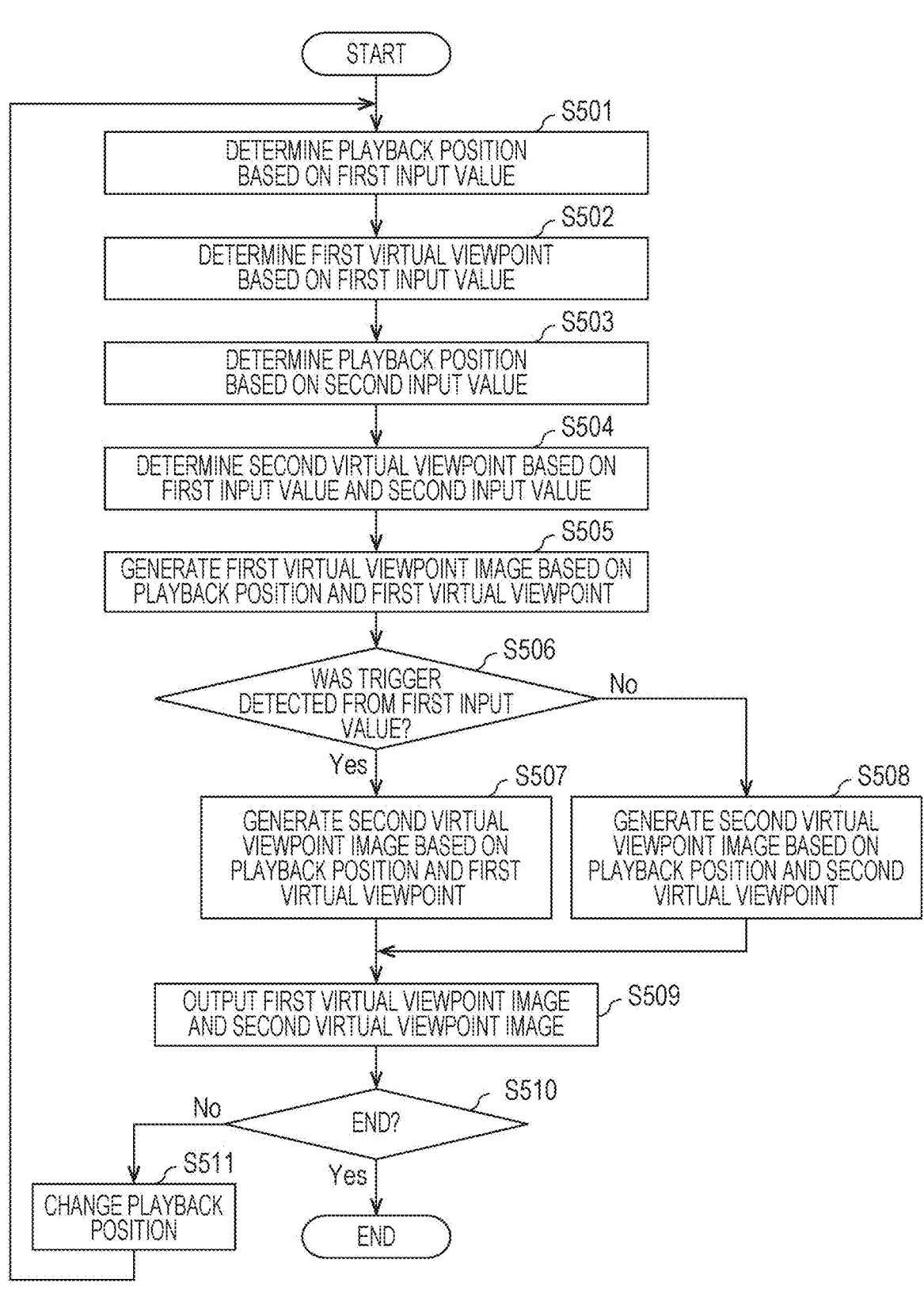
FIG. 5 is a flowchart illustrating an example of the processing procedure of the image processing apparatus according to the first embodiment.

An example of processing performed by the image processing apparatus 20 will be described with reference to the flowchart in FIG. 5. The processing by the image processing apparatus 20 is achieved by deploying the software recorded in the ROM 203 to the RAM 102 and having the CPU 201 or the GPU 206 execute the software.

In S501, the CPU 201 determines the playback position of a first virtual viewpoint video based on the first input value input from the first information processing apparatus 100. An example of the first virtual viewpoint video is the virtual viewpoint image 402. An example of the first input value to be processed in this step is a control value corresponding to the operation input to the seek bar 403 using the first input device 10. Specifically, the control value is a time code. If the first input value is not an input value related to the playback position, this step is not executed, and the next step is executed.

In S502, the CPU 201 determines the first virtual viewpoint for the first virtual viewpoint video based on the first input value input from the first information processing apparatus 100. The first virtual viewpoint is, for example, the position and orientation of the virtual camera for the virtual viewpoint image 402. An example of the first input value to be processed in this step is a control value corresponding to an operation for changing the position or orientation of the virtual camera for the virtual viewpoint image 402, input to the first information processing apparatus 100 using the first input device 10. If the swap button 409 is selected, the same parameters as those of the second virtual viewpoint are set as the first virtual viewpoint. If the first input value is not related to the first virtual viewpoint, the process of this step is not executed.

In S503, the CPU 201 determines the playback position of the second virtual viewpoint video based on the second input value input from the second information processing apparatus 200. An example of the second virtual viewpoint video is the virtual viewpoint image 401. An example of the second input value to be processed in this step is a control value corresponding to an operation input to the seek bar 413 by the second input device 40. The control value is specifically a time code. If the second information processing apparatus 200 does not have a user interface (UI), like the seek bar 413, for controlling the playback position, the CPU 201 determines the playback position of the second virtual viewpoint video to the same playback position as the playback position determined in S501. If the second input value is not an input value related to the playback position, the process of this step is not executed, and the process of the next step is executed.

In S504, the CPU 201 determines the second virtual viewpoint for the second virtual viewpoint video based on the first input value input from the first information processing apparatus 100 and the second input value input from the second information processing apparatus 200. An example of the second virtual viewpoint is the position and orientation of the virtual camera for the virtual viewpoint image 401. An example of the first input value to be processed in this step is a control value corresponding to an operation for changing the position of the virtual camera for the virtual viewpoint image 401, which is input to the first information processing apparatus 100 by the first input device 10. An example of the second input value to be processed in this step is a control value corresponding to an operation for changing the orientation of the virtual camera for the virtual viewpoint image 401, which is input to the second information processing apparatus 200 by the second input device 40.

If the swap button 409 is selected, parameters similar to those of the first virtual viewpoint immediately before the process of S502 are set as the second virtual viewpoint. If the second input value is not an input value related to the second virtual viewpoint, the process of this step is not executed. Although in this step the position of the virtual camera is determined based on the input value from the first input device 10, this is illustrative only. The position may be determined based on the input value on the second input device 40. In this case, the first input value is ignored, and the second virtual viewpoint for the second virtual viewpoint video is determined based only on the second input value.

In S505, the CPU 201 generates a first virtual viewpoint image using the GPU 206 based on the playback position determined in S501 and the first virtual viewpoint determined in S502.

In S506, the CPU 201 determines whether a trigger has been detected from the first input value. This trigger is for reflecting the virtual viewpoint for the first virtual viewpoint image to the second virtual viewpoint image. For example, if the viewpoint share button 408 or the swap button 409 in FIG. 4A is selected, the CPU 201 detects the trigger. If the trigger is detected from the first input value, the process of S507 is executed. If no trigger is detected from the first input value, the process of S508 is executed.

In S507, the CPU 201 generates a second virtual viewpoint image using the GPU 206 based on the playback position determined in S501 and the first virtual viewpoint determined in S502. In S508, the CPU 201 generates the second virtual viewpoint image using the GPU 206 based on the playback position determined in S503 and the second virtual viewpoint determined in S504.

In S509, the CPU 201 outputs the first virtual viewpoint image and the second virtual viewpoint image. For example, the CPU 201 outputs the first virtual viewpoint image to the first information processing apparatus 100 and the second virtual viewpoint image to the second information processing apparatus 200 via the input/output section 205.

In S510, the CPU 201 determines whether to terminate the processing of this flowchart. For example, when the application for playing back the virtual viewpoint image is terminated, the CPU 201 determines to terminate the processing of this flowchart. If the processing of this flowchart is not to be terminated, the process of S511 is executed.

In S511, the CPU 201 changes the playback position. For example, for forward playback, the CPU 201 moves the playback position forward by one frame. For reverse playback, the CPU 201 returns the playback position by one frame. After completion of this process, the processing of this flowchart is repeated from S501.

The processing by the image processing apparatus 20 has been described with reference to FIG. 5. This processing facilitates the coordination of multiple virtual viewpoint images. For example, the coach may allow the players to operate the virtual viewpoint image to some extent to grasp their surroundings, while also reflecting the desired shot for coaching the players to the virtual viewpoint image on the players' side.

The CPU 201 executes the playback processing, such as playback, pause, and change in the playback speed of a virtual viewpoint image as needed through interrupt processing during the execution of the processing of the flowchart.

Although in this embodiment the image processing apparatus 20 generates both of the first virtual viewpoint image (virtual viewpoint image 402) and the second virtual viewpoint image (virtual viewpoint image 401), this is illustrative only. For example, two image processing apparatuses 20 may be provided, which individually generate the first virtual viewpoint image or the second virtual viewpoint image. In this case, the two image processing apparatuses 20 communicate with each other to transmit and receive the parameters of the virtual cameras for the respective virtual viewpoint images and the playback positions of the respective virtual viewpoint images.

Modification of First Embodiment

This embodiment describes display and control of virtual viewpoint images in the first information processing apparatus 100 and the processing by the image processing apparatus 20. The same reference signs are used for the same configurations, processes, and functions as those of the first embodiment including the virtual-viewpoint-image generation system in FIGS. 1A and 1B and the first information processing apparatus 100 and the image processing apparatus 20 in FIGS. 2A and 2B, and redundant descriptions thereof will be omitted.

Figure 6:
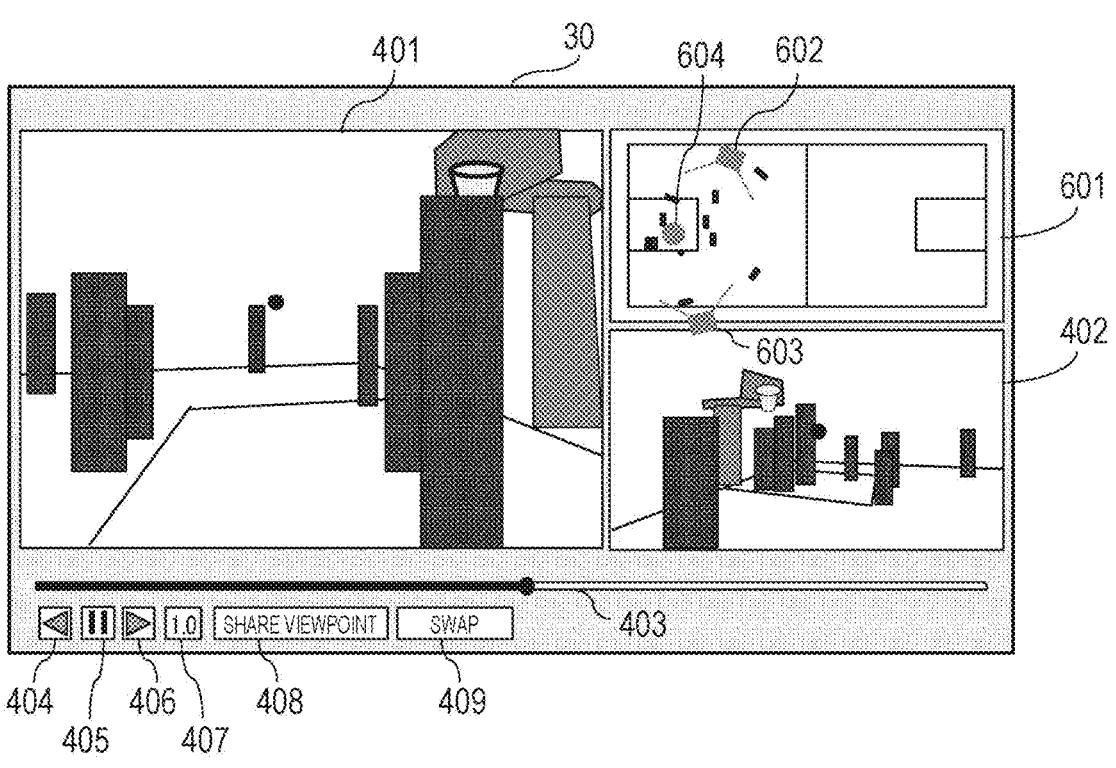
FIG. 6 is a diagram illustrating an example of the display form of a virtual viewpoint image in a modification of the first embodiment.

FIG. 6 illustrates an example of the GUI displayed on the first display device 30. A virtual viewpoint image 601 is added to the GUI in FIG. 4A.

The virtual viewpoint image 601 has a virtual viewpoint set to look down on the playing field (basketball court). Here, the black rectangular solids represent players in action. Displaying the virtual viewpoint image 601 enables the coach to easily grasp the positional relationships among the players during the game. In this embodiment, the virtual viewpoint for the virtual viewpoint image 601 is fixed and is not changed.

Furthermore, pictograms and icons may be superimposed on the virtual viewpoint image 601. An icon 602 represents the position and orientation of the virtual camera for the virtual viewpoint image 401. An icon 603 represents the position and orientation of the virtual camera for the virtual viewpoint image 402. The icon 602 and the icon 603 may be set in different colors or patterns to be distinguish from each other. Superimposing the icon 602 and the icon 603 onto the virtual viewpoint image 601 allows the coach to confirm the positions and orientations of the virtual viewpoints of the coach and the players.

When changing the position of the virtual camera for the virtual viewpoint image 402, the coach can change the position by selecting (for example, left-clicking) a position on the virtual viewpoint image 601. This facilitates moving the virtual camera instantly also for moving the position of the virtual camera, for example, from end to end of the playing field. The coach may also set a gazing point 604 by selecting (for example, right-clicking) a position on the virtual viewpoint image 601. When the coach sets the gazing point 604 and sets another position of the virtual camera using a method (left click) different from the method for setting the gazing point 604, the line of sight of the virtual camera rotates in a horizontal lateral direction (pan direction) to face the gazing point 604. For example, when the gazing point 604 is set below the goal and the position of the virtual camera is set to any location on a sideline in the court, the line of sight of the virtual camera on the sideline is automatically changed to below the goal. The current line of sight of the virtual camera may be automatically rotated so as to face the gazing point 604 as the position of the gazing point 604 is changed. While in this example the orientation (the line of sight) of the virtual camera is rotated, the line of sight of the virtual camera may be set to face the gazing point 604 simultaneously with the determination of the position of the virtual camera.

Thus, setting a target location in advance enables the user to view the target location in a moment only by setting the position of the virtual camera to any location. In the case where the first input device 10 is a touch panel, the coach may select the position by tapping and select the gazing point by double tapping.

In this case, in the process of S502 of the flowchart in FIG. 5, the CPU 201 performs the processing as follows.

In S502, the CPU 201 obtains, as a first input value, the coordinates selected in the virtual viewpoint image 601. The coordinates that the CPU 201 obtains are two-dimensional coordinates on a plane horizontal to the ground (x-y plane), and the coordinate in the direction perpendicular to the ground (z-axis direction) is not obtained. The CPU 201 applies the obtained two-dimensional coordinates to the coordinates of the current first virtual viewpoint. In other words, the first virtual viewpoint image is translated, with the height and orientation of the viewpoint kept.

In S502, the CPU 201 also obtains, as a first input value, the coordinates of the gazing point 604 selected in the virtual viewpoint image 601. The coordinates that the CPU 201 obtains are two-dimensional coordinates on a plane horizontal to the ground (x-y plane), and the coordinate in the direction perpendicular to the ground (z-axis direction) is not obtained. The CPU 201 sets the first virtual viewpoint to be oriented to the obtained two-dimensional coordinates. In other words, in the first virtual viewpoint image, the first virtual viewpoint is rotated in the pan direction so as to face the gazing point 604, with the tilt and roll of the orientation kept. The CPU 201 may rotate the orientation of the first virtual viewpoint not only in the pan direction but also in the tilt direction so that the orientation of the first virtual viewpoint is parallel to the ground.

This makes it easier for the coach to provide instructions to the players.

Second Embodiment

The first embodiment describes a process for reflecting the position and orientation of the virtual camera for the virtual viewpoint image 402 to the position and orientation of the virtual camera for the virtual viewpoint image 401 based on a predetermined trigger. In a second embodiment, some parameters of the virtual camera for the virtual viewpoint image 402 are reflected to the virtual viewpoint image 401, and some parameters of the virtual camera for the virtual viewpoint image 401 are reflected to the virtual camera for the virtual viewpoint image 402 based on a predetermined trigger.

The same reference signs are used for the same configurations, processes, and functions as those of the first embodiment, and redundant descriptions thereof will be omitted.

Figure 7:
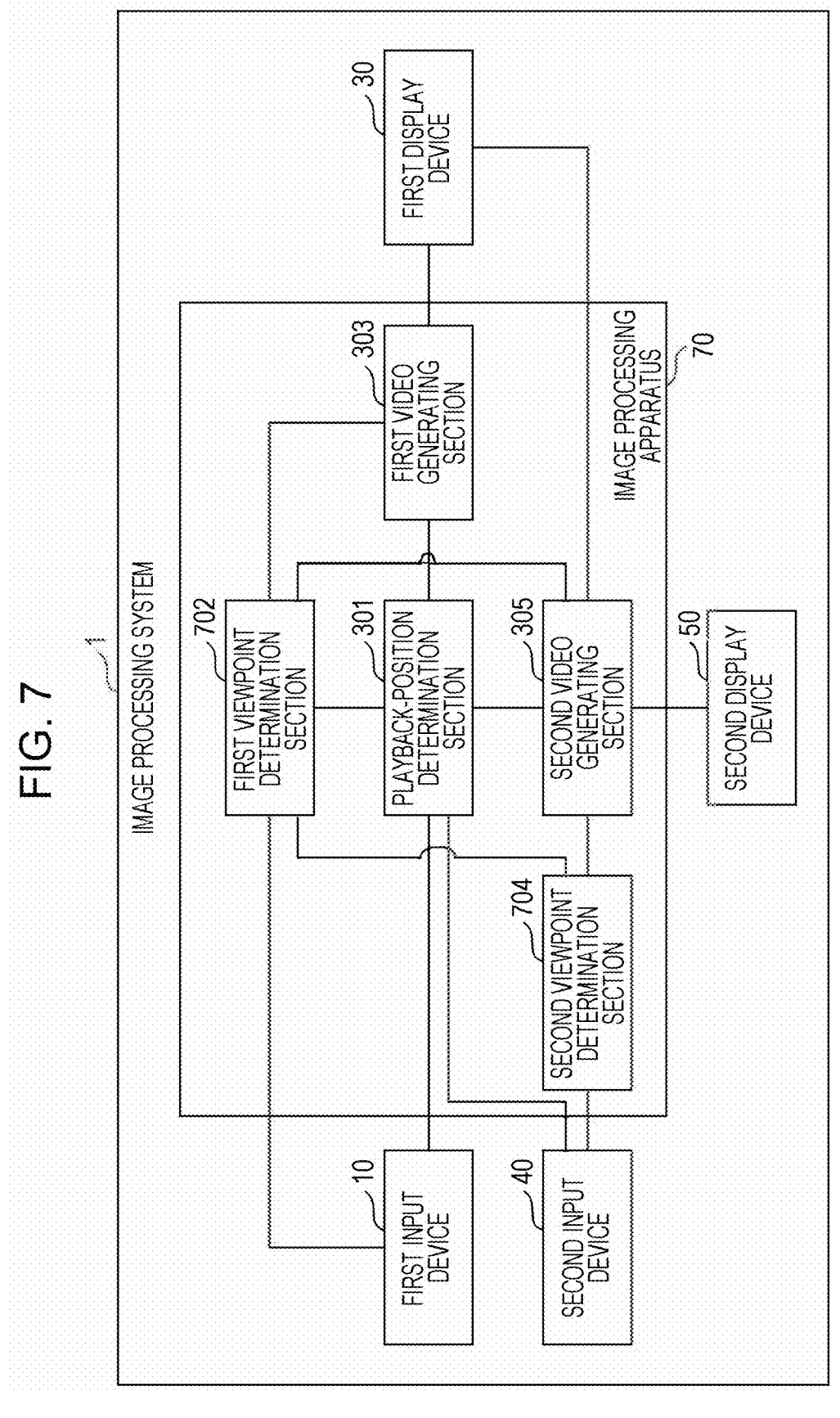
FIG. 7 is a diagram illustrating an example of the functional configuration of an image processing system according to a second embodiment.

FIG. 7 is a diagram illustrating an example of the functional configuration of an image processing system 1 according to this embodiment. An image processing apparatus 70 includes a playback-position determination section 301, a first viewpoint determination section 702, a first video generating section 303, a second viewpoint determination section 704, and a second video generating section 305.

The first viewpoint determination section 702 determines the parameters of the virtual camera based on the input value from the first input device 10 of the first information processing apparatus 100 and some parameters of the position and orientation of the virtual camera from the second viewpoint determination section 704. For example, the first viewpoint determination section 702 calculates the camera parameters based on the input value from the input device 10 and thereafter applies the height of the viewpoint of the virtual camera obtained from the second viewpoint determination section 704 to the calculated camera parameters. This application process may be performed constantly or only when a trigger, such as pressing the viewpoint share button 408, is detected from the input value from the first input device 10. For this application process, this embodiment describes later, with reference to FIG. 8, the case where a trigger is detected from the input value from the first input device 10.

The first viewpoint determination section 702 outputs the camera parameters except the parameter (the height of the viewpoint) applied from the second viewpoint determination section 704 to the second video generating section 305. The second video generating section 305 obtains camera parameters other than the camera parameters obtained from the first viewpoint determination section 702 from the second viewpoint determination section 704 to generate a virtual viewpoint image. This prevents the virtual viewpoint from being located at an unintended position, such as a high place or the ground, even when conducting virtual reality (VR) viewing using an HMD as the second display device 50 for viewing life-size players in a basketball court. This process also allows for maintaining the height of the viewer's eye level. The camera parameters that the first viewpoint determination section 702 obtains from the second viewpoint determination section 704 may be not only the height of the viewpoint but also orientation information (for example, tilt).

When a trigger is detected from the input value from the first input device 10, the first viewpoint determination section 702 may reset some of the parameters of the virtual camera to initial values. For example, the first viewpoint determination section 702 resets the tilt and roll of the virtual camera parallel to the ground and outputs the parameters of the virtual camera except the reset parameters to the second video generating section 305. This prevents the tilt and roll of the virtual camera for the virtual viewpoint image displayed on the HMD serving as the second display device 50 from being influenced by the orientation of the virtual viewpoint of the coach. This prevents the mismatch between the orientation of the head of the VR viewer and the orientation of the virtual camera, thereby reducing viewer's VR sickness or the like caused by the mismatch of the sense of balance.

Furthermore, the first viewpoint determination section 702 may restrict changes to some parameters of the virtual camera. For example, the first viewpoint determination section 702 may disable changing the roll of the virtual viewpoint while keeping it parallel to the ground. In this case, the first viewpoint determination section 702 outputs the parameter of the virtual camera except the restricted parameters to the second video generating section 305. This reduces the misalignment between the VR viewer's image and the head orientation. The restricted parameters may include not only the roll but also the tilt. A user interface (UI) may be displayed on the first display device 30 so that the coach can select the parameter to be limited.

The second viewpoint determination section 704 has a configuration similar to that of the first embodiment. Furthermore, as described above, the second viewpoint determination section 704 according to this embodiment determines the parameters of the virtual camera based on the input value from the second input device 40 of the second information processing apparatus 200 and outputs the parameters to the first viewpoint determination section 702.

FIG. 8 is a flowchart illustrating the processing procedure for mutually reflecting the parameters of the virtual cameras for the virtual viewpoint image 401 and the virtual viewpoint image 402 based on a predetermined trigger according to this embodiment. The flowchart in FIG. 8 differs from the flowchart in FIG. 5 according to the first embodiment in that the process in S505 shifts to S802, and the process in S801 is added. The other processes are the same as those of the first embodiment.

In S801, the CPU 201 changes the parameters of the virtual camera for the first virtual viewpoint image determined by the first viewpoint determination section 702 based on some of the parameters of the position and orientation of the virtual camera determined by the second viewpoint determination section 704.

In S802, the CPU 201 generates the first virtual viewpoint image using the GPU 206 based on the playback position determined in S501 and the first virtual viewpoint determined in S502. The process of this step is the same as the process of S505 in FIG. 5 of the first embodiment.

Thus, the process for mutually reflecting the parameters of the virtual cameras for the virtual viewpoint image 401 and the virtual viewpoint image 402 based on a predetermined trigger according to this embodiment has been described. This process prevents reflecting a coach's unintended viewpoint to the players, and when the player views VR content, reduces VR sickness caused by the mismatch between the player's head position and orientation and the virtual camera's position and orientation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the scope of the invention is not limited solely to the disclosed exemplary embodiments. The scope of the following claims is to be accorded the broadest interpretation so as to encompass all such modifications and equivalent structures and functions as understood by the skilled person.

This application claims the benefit of Japanese Patent Application No. 2023-120682, filed Jul. 25, 2023, and No. 2024-025121, filed Feb. 22, 2024, which are hereby incorporated by reference herein in their entirety.

What is claimed is:

1. An image processing apparatus comprising
one or more memories storing instructions; and
one or more processors executing the instructions to:
obtain a plurality of images captured by a plurality of
  image capturing apparatuses;
generate a camera parameter of a first virtual camera
  based on an input value from a first input device;
determine a playback position of a virtual viewpoint
  image to be played back based on the input value from
  the first input device;
generate a first virtual viewpoint video based on the
  plurality of images, the camera parameter of the first
  virtual camera, and the playback position;
generate a camera parameter of a second virtual camera
  based on the input value from the first input device and
  an input value from a second input device; and
generate a second virtual viewpoint video based on the
  plurality of images, the camera parameter of the second
  virtual camera, and the playback position.

2. The image processing apparatus according to claim 1, wherein the one or more processors further execute the instructions to:
determine a position and an orientation of the first virtual
  camera based on the input value from the first input
  device;
determine a position of the second virtual camera based
  on the input value from the first input device; and
determine an orientation of the second virtual camera
  based on the input value from the second input device.

3. The image processing apparatus according to claim 1, wherein the one or more processors further execute the instructions to:

output the first virtual viewpoint video and the second virtual viewpoint video to the first input device; and output the second virtual viewpoint video to the second input device.

4. The image processing apparatus according to claim 3, wherein the one or more processors further execute the instructions to:

switch the virtual viewpoint image to be output to the second input device from the second virtual viewpoint video to the first virtual viewpoint video based on an instruction from the first input device.

5. The image processing apparatus according to claim 3, wherein the one or more processors further execute the instructions to;

change the parameter of the second virtual camera to the parameter of the first virtual camera based on an instruction from the first input device.

6. The image processing apparatus according to claim 3, wherein the one or more processors further execute the instructions to:

exchange the parameter of the first virtual camera and the parameter of the second virtual camera based on an instruction from the first input device.

7. The image processing apparatus according to claim 3, wherein the one or more processors further execute the instructions to:

change playback speeds of the first virtual viewpoint video and the second virtual viewpoint video based on an instruction from the first input device.

8. The image processing apparatus according to claim 3, wherein the one or more processors further execute the instructions to:

generate a third virtual viewpoint video from the plurality of images, the third virtual viewpoint video providing an overhead view of a captured space based on the plurality of images and the playback position; and output the third virtual viewpoint video to the first input device.

9. The image processing apparatus according to claim 8, wherein the third virtual viewpoint video includes an icon representing a position of the first virtual camera and an icon representing a position of the second virtual camera.

10. The image processing apparatus according to claim 1, wherein the one or more processors further execute the instructions to:

determine a position and an orientation of the first virtual camera based on the input value from the first input device; and determine an orientation and a height of a position of the second virtual camera based on the input value from the second input device; and determine another position of the second virtual camera based on the input value from the first input device.

11. The image processing apparatus according to claim 1, wherein the first input device comprises a tablet terminal, and wherein the second input device comprises a head-mount display.

12. A method for an image processing apparatus, the method comprising:

obtaining a plurality of images captured by a plurality of image capturing apparatuses;

generating a camera parameter of a first virtual camera based on an input value from a first input device;

determining a playback position of a virtual viewpoint image to be played back based on the input value from the first input device;

generating a first virtual viewpoint video based on the plurality of images, the camera parameter of the first virtual camera, and the playback position;

generating a camera parameter of a second virtual camera based on the input value from the first input device and an input value from a second input device; and generating a second virtual viewpoint video based on the plurality of images, the camera parameter of the second virtual camera, and the playback position.

13. A non-transitory storage medium storing a program for causing an image processing apparatus to execute a control method, the method comprising:

obtaining a plurality of images captured by a plurality of image capturing apparatuses;

generating a camera parameter of a first virtual camera based on an input value from a first input device;

determining a playback position of a virtual viewpoint image to be played back based on the input value from the first input device;

generating a first virtual viewpoint video based on the plurality of images, the camera parameter of the first virtual camera, and the playback position;

generating a camera parameter of a second virtual camera based on the input value from the first input device and an input value from a second input device; and generating a second virtual viewpoint video based on the plurality of images, the camera parameter of the second virtual camera, and the playback position.

* * * * *